(12) United States Patent
Minowa (10) Patent No.: US 8,582,076 B2
(45) Date of Patent: Nov. 12, 2013

(54) METHOD OF MANUFACTURING LIQUID CRYSTAL PANEL COMPRISING APPLICATION OF SEAL PRINTING PLATE INCLUDING MESH PORTION

(75) Inventor: Kenichi Minowa, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 521 days.

(21) Appl. No.: 12/874,457

(22) Filed: Sep. 2, 2010

(65) Prior Publication Data

US 2011/0058139 A1    Mar. 10, 2011

(30) Foreign Application Priority Data

Sep. 4, 2009   (JP) .................................. 2009-204718

(51) Int. Cl.
*G02F 1/1339*    (2006.01)

(52) U.S. Cl.
USPC ......................................... 349/190; 427/282

(58) Field of Classification Search
USPC ......................................... 349/190; 427/282
See application file for complete search history.

(56) References Cited

U.S. PATENT DOCUMENTS

| 5,493,969 | A  | * | 2/1996 | Takahashi et al. | ............. 101/126 |
| 6,173,648 | B1 | * | 1/2001 | Misono et al. | ................ 101/474 |
| 2010/0020275 | A1 | * | 1/2010 | Mima et al. | ................... 349/106 |

FOREIGN PATENT DOCUMENTS

| JP | 6-64359 | | 3/1994 |
| JP | 11-218773 | | 8/1999 |
| JP | 2007290305 | A * | 11/2007 |

* cited by examiner

*Primary Examiner* — Michael Caley
(74) *Attorney, Agent, or Firm* — Oblon, Spivak, McClelland, Maier & Neustadt, L.L.P.

(57) ABSTRACT

A method of manufacturing a liquid crystal panel including two glass substrates, which face each other and are bonded by a circumference seal of a display area, and which hold a liquid crystal therebetween, comprising the steps of: disposing a seal printing plate comprising a mesh cross-points; and applying the circumference seal on either one of the two glass substrates by using the seal printing plate, wherein the mesh cross-points of the seal printing plate contact with a light shielding region of pixels in the display area.

6 Claims, 7 Drawing Sheets

METHOD OF MANUFACTURING LIQUID CRYSTAL PANEL COMPRISING APPLICATION OF SEAL PRINTING PLATE INCLUDING MESH PORTION

CROSS-REFERENCE TO RELATED APPLICATION

This application claims priority from Japanese Patent Application No. 2009-204718 filed on Sep. 4, 2009, the entire subject matter of which is incorporated herein by reference.

BACKGROUND

1. Technical Field

The present invention relates to a method of manufacturing an active matrix type liquid crystal panel that is driven by thin film transistors formed on a glass substrate. Specifically, the present invention relates to a method of manufacturing a liquid crystal panel that is suitable to be applied to a process of printing a sealant on a glass substrate by using a seal plate.

2. Description of the Related Art

Recently, Flat Panel Displays (FPDs), such as liquid crystal displays, have used in many fields including television receivers, computers, and the like due to their light-weight, ultra-thin, and small power-consumption characteristics. According to the diversity of purpose in the market, it is increasing that a demand for not only a yield improvement to improve the productivity but also an improvement of image quality.

A liquid crystal panel includes a pair of glass substrates that face each other with a predetermined gap, which is formed by spacers interposed between the glass substrates, and liquid crystals filled and hold between the glass substrates. One substrate is an active matrix substrate (hereinafter referred to as a "TFT substrate") where thin film transistors are formed, and the other substrate is a color filter (hereinafter referred to as a "CF") substrate that face to the TFT substrate. Conduction layers are formed on the respective substrate, and the driving of the liquid crystals is controlled by electrical charge between the conduction layers. A controlling of the driving of the liquid crystals provided on a transistor formed section or a wiring section in a display area of the TFT substrate is harder than controlling the driving of the liquid crystals provided on a pixel region. Thus, a desired display can be provided by intercepting penetration of light by forming of a light shielding layer (black matrix: hereinafter referred to as "BM") on the CF substrate side that face to the TFT substrate.

As described above, in order to seal the liquid crystals between the two glass substrates, a sealant is applied on the circumference of a display area on the glass substrate, and the pair of glass substrates is combined to each other. There are two principal methods of applying the sealant on the glass substrate as a circumferential seal of the display area, as follows.

A first method is a method that fills a sealant in an injector shaped syringe and applies the sealant on the substrate without lifting the syringe. A second method is a method that prepares a seal printing plate (hereinafter referred to as a "seal plate") and prints a sealant on the glass substrate. According to the first method, since a seal pattern is applied on the circumference of the display area without lifting, the sealant does not contact with the display area of the panel, and thus a liquid crystal panel having a high image quality can be accomplished. However, there is a problem that the manufacturing takt-time is lengthened by the applying work without lifting. Although using a plurality of syringes for shortening the manufacturing takt-time may be considered, the scale of equipment is enlarged and a lot of time is required in preparing the applying work.

In contrast, according to the seal printing method, which is the second method, a plurality of seal patterns can be spread at once, and thus the manufacturing takt-time can be greatly shortened. However, since the seal plate contact with the display area in the liquid crystal panel, an alignment layer may be damaged. The damage causes an alignment state of the liquid crystals to be scattered (abnormal alignment area) and to worsen the image quality. Further, in severe case, the damaged liquid crystal panel becomes defective product and cause to the yield deterioration.

The seal plate is configured to print the sealant on the glass substrate through interspaces of a mesh-shaped cloth, which is weaved a plurality of fibers in a lattice form, by pushing the sealant. To the areas where the sealant is not printed, a resin-shaped material, which is called an emulsion, is provided to distinguish the print areas.

Figure 6:
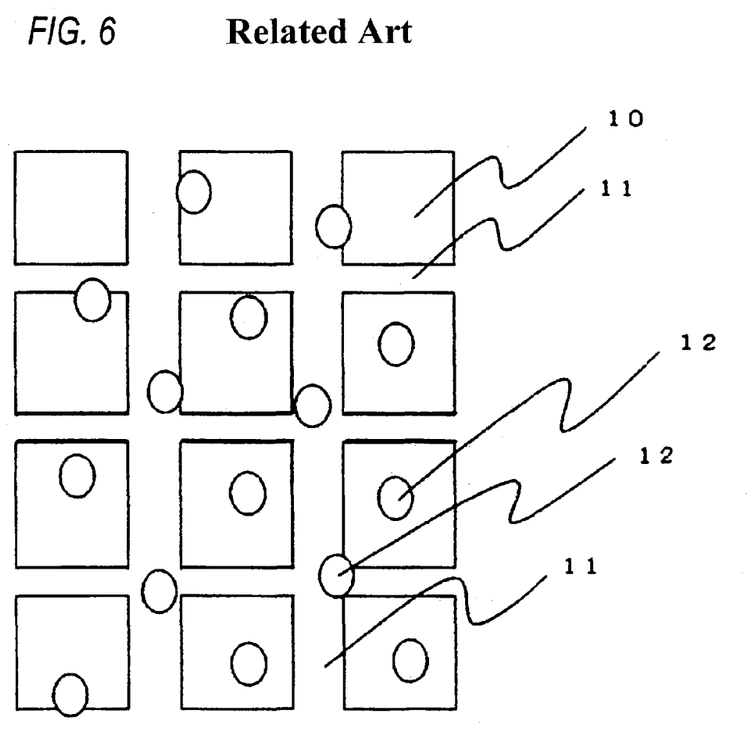
FIG. 6 is a schematic view showing occurrence positions of mesh marks according to a seal printing method in the related art.

Here, as shown in FIG. 6, due to the printing pressure and an sliding operation of a seal squeegee during the seal printing, cross-point sections of the mesh-shaped fiber are strongly pressed to the alignment layer of the glass substrate through the emulsion section. Thus, the alignment layer is damaged, and a large number of abnormal alignment areas (hereinafter referred to as "mesh marks") 12 occur.

In one example of related arts, in order to suppress the occurrence of the mesh marks 12, a thickness of the seal plate around penetration sections is made to be thicker than a thickness of the display region, so that the seal plate do not contact with the alignment layer in the display area (see e.g. JP-A-H11-218773). Also, in one example of the related art, print protrusions are provided on the penetration sections of the sealant, so that the seal plate do not contact with the alignment layer in the display region (see e.g. JP-A-H06-64359).

However, even in either of the above-described cases, although an improvement to suppress the occurrence of the mesh marks 12 is accomplished, a uniform pressure is not applied over the entire seal plate during the seal printing process due to the change of the thickness of the seal plate. Thus, the width of the seal printed section becomes non-uniform (becoming thickened, cracked and the like). The non-uniformed printed section causes the finished quality of the seal print itself to deteriorate and also cause the yield in the seal printing process to deteriorate.

Accordingly, an object of the present invention is to suppress the yield deterioration in the seal printing process and to suppress the display-quality deterioration by the mesh marks 12 occurring during the seal printing.

SUMMARY

In the invention, a method of manufacturing a liquid crystal panel including two glass substrates, which face each other and are bonded by a circumference seal of a display area, and which hold a liquid crystal therebetween, comprising the steps of: disposing a seal printing plate comprising a mesh cross-points; and applying the circumference seal on either one of the two glass substrates by using the seal printing plate, wherein the mesh cross-points of the seal printing plate contact with a light shielding region of pixels in the display area.

According to the invention, in the seal printing process, the mesh cross-points of the seal plate are provided to contact with BM regions of a CF substrate and perform the printing. Although the suppression of the mesh marks is not possible, it is possible to take the mesh marks out of the display region (out of a CF opening section) by making the mesh marks in the BM regions of the CF substrate. As a result, a liquid crystal panel having a high image quality can be manufactured without a recognizing the mesh marks. Further, since a uniform pressure can be applied to the seal plate without changing the thickness of the seal plate, the uniformity of the original seal printing width can be kept, and the yield deterioration in the seal printing process can be suppressed.

DETAILED DESCRIPTION OF THE PREFERRED EMBODIMENTS

Hereinafter, embodiments of the invention will be described with reference to the accompanying drawings. In order to avoid duplicate and wordy explanations in the following description, the same elements will be designated by the same reference signs in each drawing.

[Embodiment 1]

Figure 1:
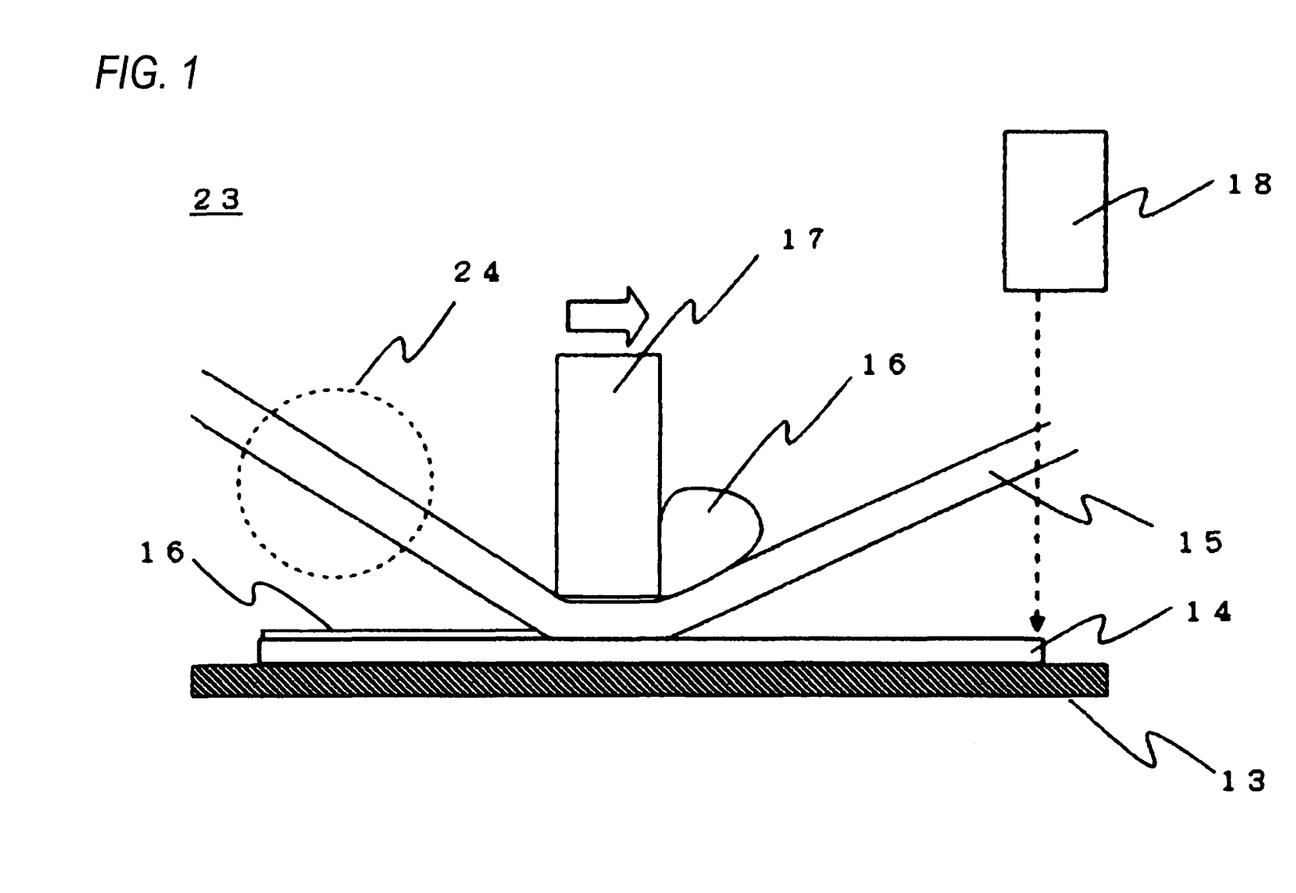
FIG. 1 is a view showing the configuration of a seal printing device according to an embodiment 1 and an embodiment 2 of the invention.

Hereinafter, embodiment 1 of the invention will be described with reference to the accompanying drawing. First, as shown in FIG. 1, a seal printer 23 is necessary to seal-print of a circumferential seal on a glass substrate by using a seal plate 15. The seal printer 23 includes a seal print stage 13, a seal plate 15, a seal squeegee 17, and an alignment camera 18.

In order to seal-print a sealant 16 on the glass substrate (in this embodiment, CF substrate 14), the CF substrate 14 where alignment marks (not illustrated) are printed is put on the seal print stage 13, and the camera 18 having an alignment function is provided. A seal printing position is controlled by performing a position control between the seal plate 15 having an outline section where alignment marks (not illustrated) are provided and the CF substrate 14. The sealant 16 is put on the seal plate 15, and then the seal squeegee 17 is pressing and sliding on the seal plate 15 in a direction along with an arrow. Accordingly, the sealant 16 is pushed out from an opening section 21 of the seal plate 15 and printed on the CF substrate 14.

Figure 2A:
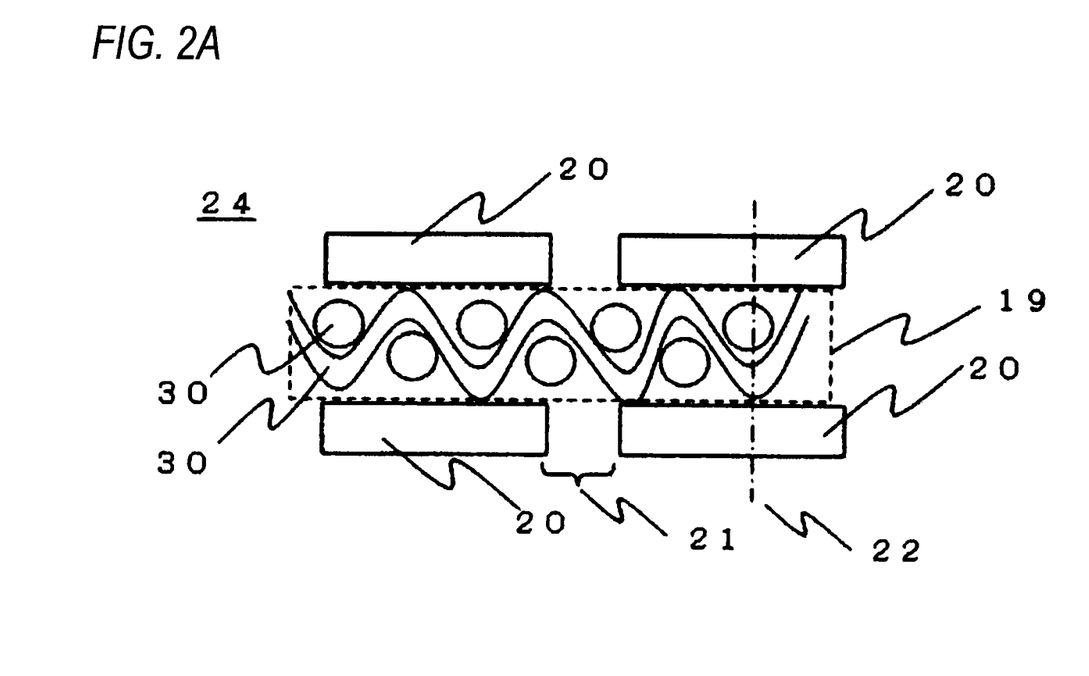
FIGS. 2A and 2B are an enlarged sectional views each showing a circumference of a seal opening portion of a seal plate according to an embodiment 1 and an embodiment 2 of the invention.
Figure 2B:
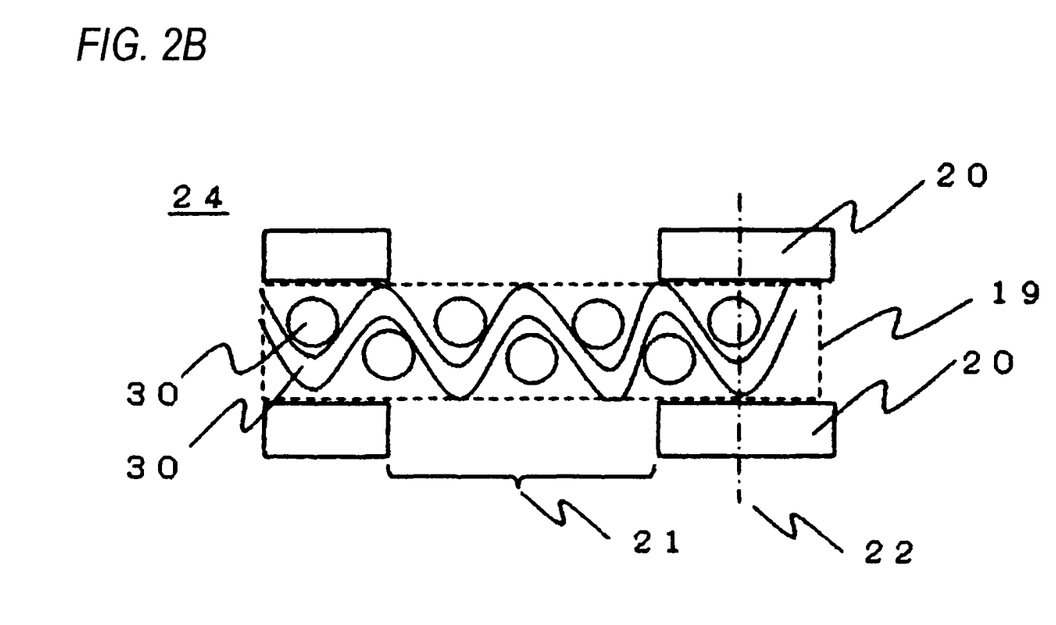
Figure 3:
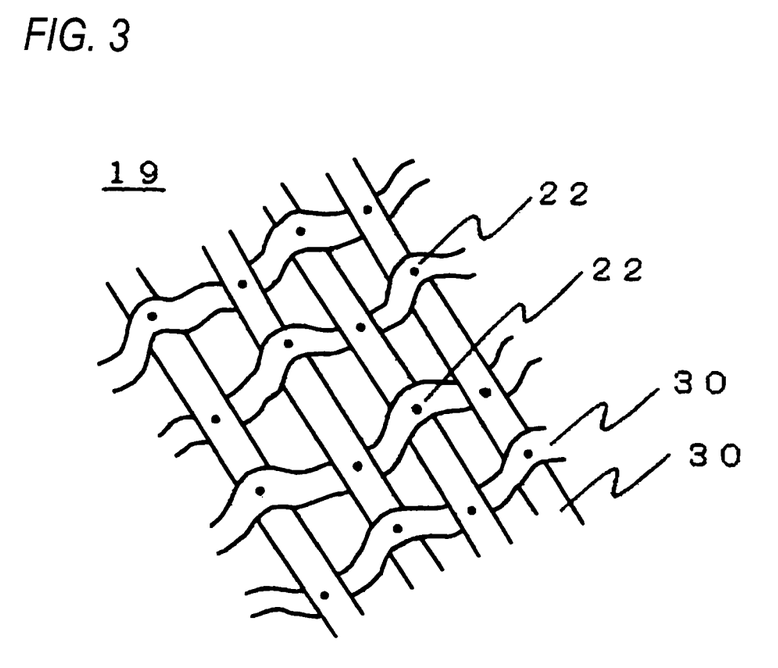
FIG. 3 is a schematic view showing a mesh structure of a seal plate.

Here, FIGS. 2A and 2B is an enlarged sectional view of a circumference 24 of the seal opening section of the seal plate 15, and FIG. 3 is a schematic view showing a mesh structure of the seal plate 15. The seal plate 15 includes a PM (Planting Metal) mask including: a mesh area 19 formed by weaving a mesh fiber 30, which is made up by a stainless steel wire having a wire diameter of 65 μm; and an emulsion area 20 excepting the opening section 21 is plated by Nickel (hereinafter referred to as "Ni"). Here, the emulsion area 20 includes Ni thin film product that Ni plating thickness of about 30 μm. In addition, the opening section 21 may be configured as shown is FIG. 2B.

Since the PM mask has a good dimensional stability, a long life span, and a flat printing surface, it is known as an optimum mask in printing a liquid crystal seal that is specifically sensitive to the mesh marks of the alignment layer. However, in a seal printing process that processing a large number of glass substrates, the seal squeegee 17 repeatedly slides on the seal plate. Applied pressures to the alignment layer are different between the emulsion section 20 that corresponds to cross-points 22 of the mesh section 19 and other emulsion section 20 in other places. Due to the different printing pressure onto the seal plate, the mesh marks is occurred.

Figure 4:
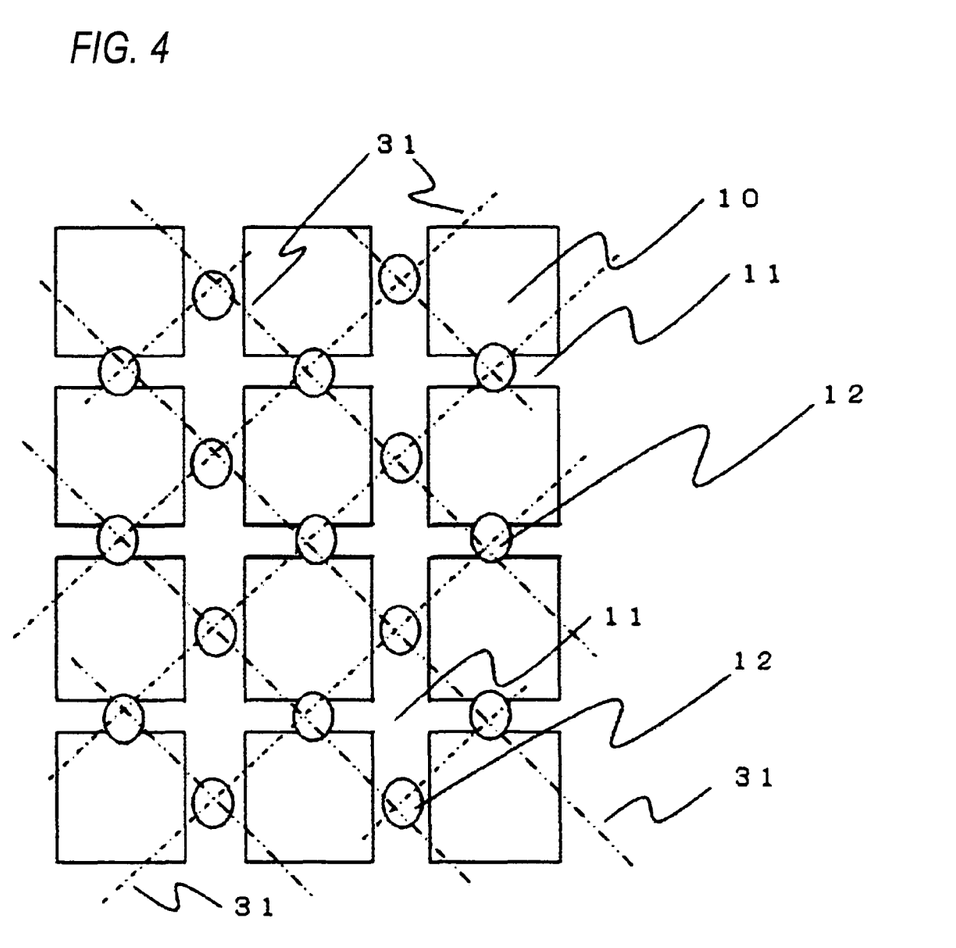
FIG. 4 is a schematic view showing occurrence positions of mesh marks according to embodiment 1 of the invention.

In the embodiment 1 of the invention, dimensions between fibers or thickness of fibers are determined so that the cross-points 22 of the mesh fiber 30 of the seal plate 15 contacts with the BM region 11 of the CF substrate 14. Also, in the embodiment 1 of the invention, the arrangement of the mesh cross-points is controlled to have an angle of substantially 45 degrees against the arrangement of the CF pixels (CF openings 10). In an example of the CF substrate 14 for a liquid crystal panel having a width across corner of 12.1 inches and a resolution of XGA (1024 (in width)×768 (in length) pixels) as shown in FIG. 4. The pixel pitches of this liquid crystal panel have the same dimensions vertically and horizontally, for example, 240 μm. In this case, the mesh fiber 30 has a line pitch of 170 μm or less, and uses a plain weave stainless screen plate having mesh number of 150/inch.

As a result, in the seal printer 23, it becomes possible to control the positional relationship between the seal plate 15 and the glass substrate 14 by an alignment tool between them. Thus, in the schematic view of the occurrence positions of the mesh marks 12 as shown in FIG. 4, it is possible to make all the mesh marks 12 occur in the BM region 11 of the CF substrate 14 by positioning the mesh cross-points 22 in the BM region 11. Accordingly, the mesh marks 12 do not occur in the CF opening section 10 relating to display.

In the present invention, it is preferable for an alignment device to make the cross-point section 22 of the mesh center 31 of the mesh marks to contact with the BM region 11 of the CF substrate 14. Here, the material of the emulsion section 20 of the seal plate is considered. If the emulsion section 20 has a high flexibility, there is a high possibility that the accuracy of the alignment position is decreased due to the pressing and sliding of the seal squeegee 17 during the seal printing process. It is preferable that the material of the emulsion section 20 is a metal, as a countermeasure. In this embodiment, it is exemplified that the emulsion section 20 uses the Ni plating of about 30 μm. However it may not be limited. The thickness of the plating may be set from 20 μm to 70 μm. Further, in this embodiment, it is exemplified that the plain weave stainless screen plate using a stainless wire of 65 μm is used as the mesh fiber. However, the wire diameter may not be limited. The wire diameter may be set from 20 μm to 100 μm.

A material of the metal thin film is preferably a metal thin film which is relatively hard and is hardly deformed, such as aluminum (Al), iron (Fe), copper (Cu), or the like, in addition to Ni adopted in this embodiment.

Also, in the seal printing process as described above, since the printing process is repeatedly performed with respect to a large number of glass substrates, the variation of dimensions (the distance between fabrics) of the seal plate is occurred. The variation of dimensions is a primary factor of alignment deviation and cause to deteriorate of display quality due to the mesh marks. In order to avoid this problem, it is preferable to firmly hold both the outline that maintains the seal plate and the stainless screen plate.

[Embodiment 2]

Figure 5:
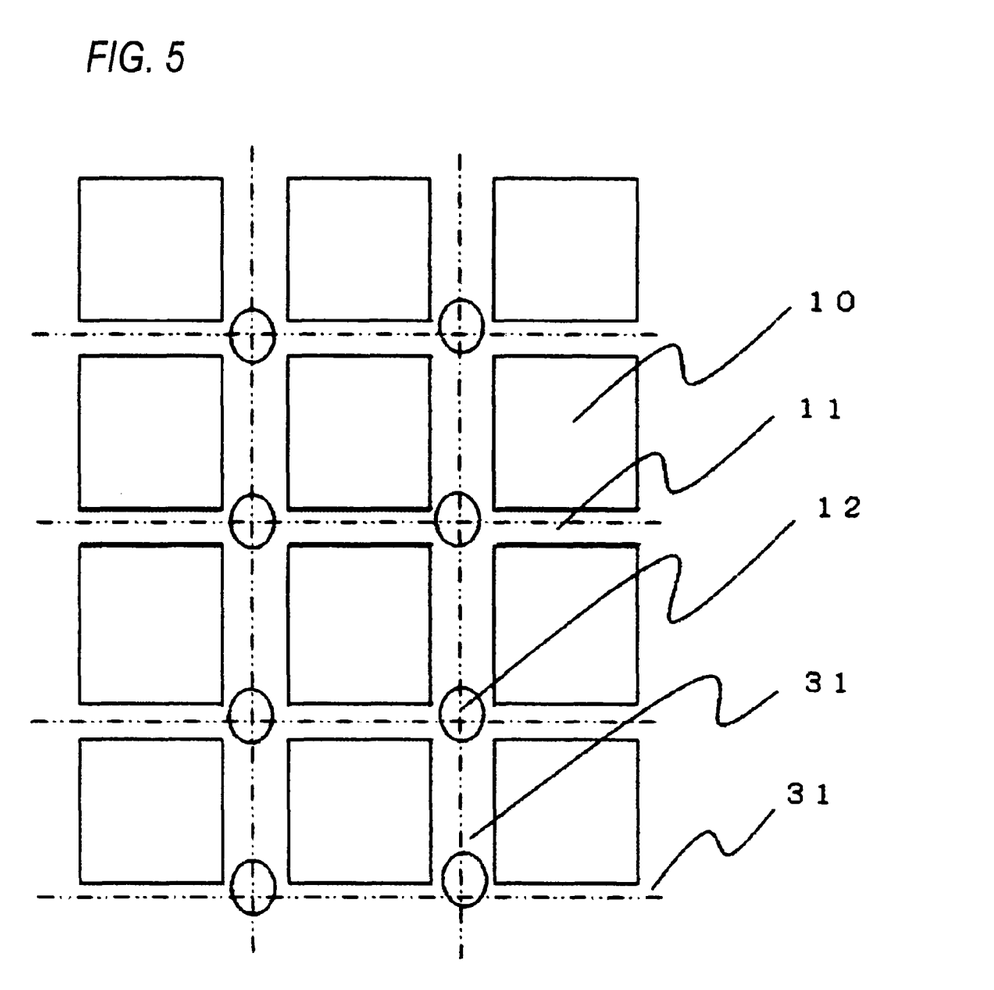
FIG. 5 is a schematic view showing occurrence positions of mesh marks according to embodiment 2 of the invention.

FIG. 5 is a schematic view showing the occurrence positions of the mesh marks 12 in the case of seal printing using the seal plate according to embodiment 2 of the invention. As shown in FIG. 5, the center of meshes 31 of the vertical and horizontal fibers is disposed in parallel (zero degree) to the arrangement of the CF pixels (CF opening section 10) so that the cross-point sections 22 correspond to the cross-point sections of the BM region 11 of the CF substrate 14. In this case, it is sufficient to set such that the line pitch of the mesh fiber 30 becomes n times (where, n is a positive integer) that is equal to the arrangement pitch of the CF pixels (CF opening section 10). In this embodiment, since the mesh marks are arranged in the cross section of the BM region 11 having a wide area, there is a tolerance to an alignment deviation of up and down direction, right and left direction.

[Embodiment 3]

In the embodiment 1 and embodiment 2 as described above, the mesh screen plate including the plain weaved stainless wires is used as the seal plate. In this embodiment, a screen plate adopting called as alpha meshes is used. As is well known, the alpha meshes are a flat screen plate formed by precipitation-forming Ni in an additive method (electroforming method).

Due to the alpha meshes, this screen plate has a superior dimensional stability, and the mesh pitches can be set somewhat freely. Accordingly, even with fine mesh pitches of 250 and 400 mesh/inch, a high dimensional accuracy can be accomplished. In this embodiment of the invention, this screen plate is used as the seal plate of a liquid crystal panel (in which the dot pitch becomes 249 pixels/inch) having a width across corner of 16 inches and a high resolution of QUXGA (3200 (in width)×2400 (in length) pixels). In this embodiment, in the same manner as in the embodiment 2, an advantageous arrangement against the alignment deviation is used by making the direction of a vertical and horizontal lattice portion, which forms the meshes of the seal plate, become in parallel (zero degree) to the arrangement of the CF opening section 10.

Since the alpha mesh is not textile, there is few protrusion in not only the mesh cross-point section also the entire region. Thus, the damage on the alignment film of the glass substrate is suppressed, thereby effectively preventing the mesh marks.

In the above-described embodiment 1, it is exemplified that the seal plate includes a stainless screen having the mesh number of 150 mesh/inch and a wire diameter of 65 μm, and the PM mask includes the emulsion section formed by Ni plating. However, the present invention is not limited to such a screen specification, and the number of meshes, the wire diameter, and the like, are appropriately selected according to the pixel pitch of the corresponding CF substrate. Further, the wire material of the mesh area may not be limited a metal wire such as the stainless wire, and it is also possible to use a resin fiber such as polyester, polyarylate, and the like. Also, the material of the emulsion area may not be limited to a metal single layer by Ni plating, and a two-layer structure of silicon resin and a metal thin film, or hard single-layer resin layer can be applied to the invention as the material of the emulsion section.

Also, in the embodiment 1 to embodiment 3, it is exemplified that the printing of the sealant is performed only with respect to the CF substrate. However, the printing of the sealant mat not be limited to the CF substrate, and may be performed with respect to the opposite TFT substrate. Specifically, in the BM on-array type TFT substrate where the BM is formed on the TFT array, the BM covers the TFT array unit, and thus the damage of not only the alignment layer but also the TFT array unit can be effectively suppressed.

What is claimed is:

1. A method of manufacturing a liquid crystal panel including two glass substrates, which face each other and are bonded by a circumference seal of a display area, and which hold a liquid crystal therebetween, the method comprising:
    disposing a seal printing plate including a plurality of mesh cross-points; and
    applying the circumference seal on one of the two glass substrates using the seal printing plate,
    wherein the mesh cross-points of the seal printing plate contact a light shielding region of pixels in the display area, and
    wherein mesh-fibers of the seal printing plate are respectively aligned in a direction that is inclined at substantially 45 degrees to a direction in which the pixels are arranged.

2. The method of manufacturing a liquid crystal panel according to claim 1, wherein the disposing includes:
    reading a position of alignment marks on the one of the two glass substrates and the seal print plate using a camera having an alignment function; and
    adjusting an alignment between the seal printing plate and the one of the two glass substrates.

3. The method of manufacturing a liquid crystal panel according to claim 1, wherein a pitch of the mesh cross-points of the seal printing plate is determined by a pixel pitch.

4. The method of manufacturing a liquid crystal panel according to claim 1, wherein the mesh cross-points of the seal printing plate contact the light shielding region of the pixels in the display area such that the mesh cross-points surround corresponding ones of the pixels.

5. The method of manufacturing a liquid crystal panel according to claim 1, wherein the mesh-cross points of the seal printing plate are aligned in the direction that is inclined at substantially 45 degrees to the direction in which the pixels are arranged.

6. The method of manufacturing a liquid crystal panel according to claim 1, wherein the mesh cross-points of the seal printing plate are aligned in a direction that is parallel to the direction in which the pixels are arranged.

* * * * *